(12) United States Patent
Kain

(10) Patent No.: US 11,949,823 B2
(45) Date of Patent: Apr. 2, 2024

(54) APPARATUS, SYSTEM, AND METHOD FOR ANALOG TO DIGITAL FILM CONVERSION

(71) Applicant: C&A Marketing Inc., Edison, NJ (US)

(72) Inventor: Sam Kain, Edison, NJ (US)

(73) Assignee: C&A Marketing Inc, Edison, NJ (US)

( * ) Notice: Subject to any disclaimer, the term of this patent is extended or adjusted under 35 U.S.C. 154(b) by 320 days.

(21) Appl. No.: 17/478,951

(22) Filed: Sep. 19, 2021

(65) Prior Publication Data

US 2023/0090015 A1 Mar. 23, 2023

(51) Int. Cl.
*H04N 1/00* (2006.01)
*G03B 19/04* (2021.01)

(52) U.S. Cl.
CPC ......... *H04N 1/00259* (2013.01); *G03B 19/04* (2013.01); *H04N 1/00251* (2013.01); *H04N 1/00267* (2013.01); *H04N 1/00273* (2013.01); *G03B 2206/008* (2013.01)

(58) Field of Classification Search
CPC ........... H04N 1/00259; H04N 1/00251; H04N 1/00267; H04N 1/00273; H04N 5/253; G03B 19/04; G03B 15/00; G03B 2206/008
See application file for complete search history.

(56) References Cited

U.S. PATENT DOCUMENTS

| | | | | |
|---|---|---|---|---|
| 2,129,467 | A * | 9/1938 | Frederick | G03B 21/32 |
| | | | | 242/327.3 |
| 4,602,857 | A * | 7/1986 | Woltz | G03B 37/02 |
| | | | | 352/91 C |
| 5,012,346 | A * | 4/1991 | DeJager | G03B 27/542 |
| | | | | 355/71 |
| 5,823,454 | A * | 10/1998 | Erck | G03B 17/425 |
| | | | | 242/356.2 |
| 2002/0012134 | A1 * | 1/2002 | Calaway | H04N 1/00137 |
| | | | | 358/1.18 |

OTHER PUBLICATIONS https://www.etsy.com/listing/1426207633/ohnar-vu-8mm-film-viewer-editor?gpla=1&gao=1&&utm_source=google&utm_medium=cpc&utm_campaign=shopping_us_a-electronics_and_accessories-tv_and_projection-projectors&utm Sep. 2023.*
https://www.bhphotovideo.com/c/product/1272222-REG/wolverine_data_f2dmm100_8mm_and_super_8.html/overview?ap=y&ap=y&smp=y&smp=y&lsft=BI%3A514&gclid=EAlaIQobChMIvtHmwuHTgQMViNrICh2yPgL7EAQYAyABEgKJ2vD_BwE Aug. 2016.*

* cited by examiner

*Primary Examiner* — Christopher E Mahoney
(74) *Attorney, Agent, or Firm* — Bochner PLLC; Andrew D. Bochner

(57) ABSTRACT

Provided for is a film conversion apparatus comprising a body and a first reel shaft having a first proximal end and a first distal end. A first reel may be disposed on the first distal end. The apparatus may include a second reel shaft having a second proximal end and a second distal end, where the first proximal end and the second proximal end are movably attached to the body. A second reel may be disposed on the second distal end. The apparatus may further include a camera configured to capture a plurality of frames and a computer configured to convert the plurality of frames to a digital format.

10 Claims, 4 Drawing Sheets

APPARATUS, SYSTEM, AND METHOD FOR ANALOG TO DIGITAL FILM CONVERSION

FIELD OF THE INVENTION

This disclosure relates to an apparatus, system, and method for converting media. Specifically, this disclosure relates to an apparatus, system, and method, for receiving, processing, and converting film to a digital format.

INTRODUCTION

There is a rich history of camera production for both the commercial and consumer markets. Among the first movie cameras, was a device called the Kinetograph. This was the first camera capable of capturing motion pictures using strips of film. The Kinetograph utilized both a celluloid film (developed in 1889) and a 35 mm film. However, the Kinetograph required great skill and knowledge to operate.

In the 1930's development of cameras utilizing 8 mm film surged. The first 8 mm film camera garnering commercial success was the Cine Kodak Eight Model 20. Consumers were drawn to the Model 20 for its ease of use, however the Model 20 was still quite large. The market responded by introducing cameras, like those produced by Paillard-Bolex SA, that were "pocket" sized and designed for the amateur videographer.

For perhaps the first time, video cameras were being designed and marketed to the average consumer. The home video recorder became a mainstay in the homes of most Americans. As technology advanced, the size, usability, and storage capacity of the average camera improved greatly. However, these advancements and the demands of the public drove video cameras to continually utilize new and improved formats.

In 1965, at the 1964-66 Worlds Fair, Kodak unveiled a new format: Super 8 film. Super 8 was designed with a plastic light-proof cartridge that could contain roughly 3,600 frames per film cartridge.

Unfortunately, to the dismay of many 8 mm camera owners, Eastman Kodak officially discontinued manufacture of the film in 1992. Not long after, many major manufacturers stopped support for Super 8, as well.

While these advancements brought new and improved cameras into the hands of consumers, these advancements also left many consumers with film that they could no longer access. Consequently, many precious memories and home movies became entombed in defunct formats.

To meet this new film conversion demand, many audiovisual shops offered conversion services. However, these services were often inconvenient, lengthy, and expensive. Further, many of these external conversion services were only able to convert 8 mm film to other formats that were becoming scarce (for example, mini-DV tape or VHS cassettes). Thus, there was a need for a lasting at-home conversion technique.

Like the film reels themselves, at-home film conversion devices are cumbersome and difficult to use. Thus, it would be desirable, to provide apparatuses, systems and methods for simple conversion of film to a digital format. It would be yet further desirable to provide conversion apparatuses with improved usability and compactness.

SUMMARY OF THE INVENTION

The invention of the present disclosure may be a film conversion apparatus comprising a body and a first reel shaft having a first proximal end and a first distal end. A first reel may be disposed on the first distal end. The apparatus may include a second reel shaft having a second proximal end and a second distal end, where the first proximal end and the second proximal end are movably attached to the body. A second reel may be disposed on the second distal end. The apparatus may further include a camera configured to capture a plurality of frames and a computer configured to convert the plurality of frames to a digital format.

Further, the first reel shaft and/or the second reel shaft may be foldable. In an embodiment, the apparatus further comprises a motor and a belt, where the motor may be in mechanical communication with the second reel via the belt. In a further embodiment, the belt may be flexible. The apparatus may also include a display in electrical communication with the computer. Further, the apparatus may include a control panel having a plurality of buttons, each of the plurality of buttons in electrical communication with the computer.

In an embodiment, the apparatus has a handle (for example, allowing a user to more easily grip the apparatus). In an embodiment, the apparatus may be configured to convert standard 8 mm film and/or Super 8 film. The first reel and the second reel may be detachable from the first reel shaft and the second reel shaft, respectively.

DETAILED DESCRIPTION OF THE INVENTION

Figure 1:
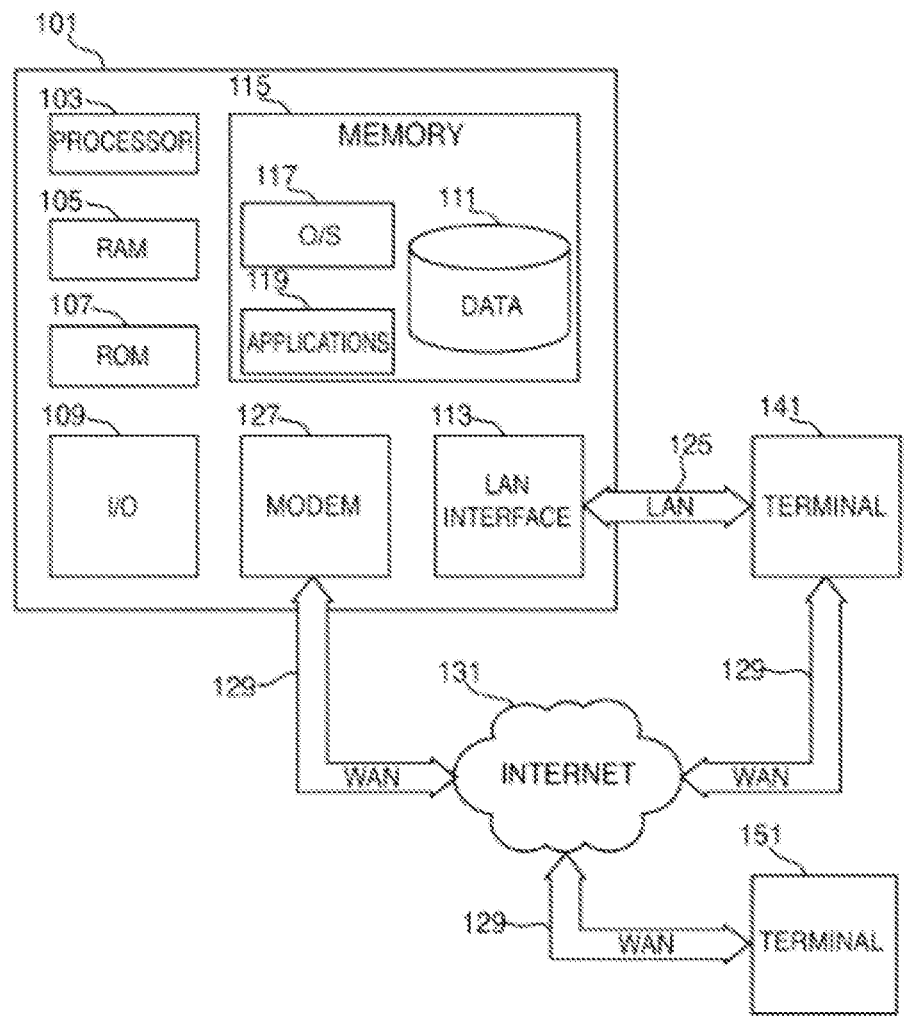
FIG. 1 is an illustrative block diagram of a system based on a computer.

The detailed description provided herein, along with accompanying figures, illustrates one or more embodiments, but is not intended to describe all possible embodiments. The detailed description provides exemplary systems and methods of technologies, but is not meant to be limiting, and similar or equivalent technologies, systems, and/or methods may be realized according to other examples as well.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or process the software in a distributive manner by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" as used herein typically includes and refers to executable instructions, code, data, applications, programs, program modules, or the like maintained in an electronic device such as a ROM. The term "software" as used herein typically includes and refers to computer-executable instructions, code, data, applications, programs, program modules, firmware, and the like maintained in or on any form or type of computer-readable media that is configured for storing computer-executable instructions or the like in a manner that may be accessible to a computing device.

The terms "computer-readable medium", "computer-readable media", and the like as used herein and in the claims are limited to referring strictly to one or more statutory apparatus, article of manufacture, or the like that is not a signal or carrier wave per se. Thus, computer-readable media, as the term is used herein, is intended to be and must be interpreted as statutory subject matter.

The term "computing device" as used herein and in the claims is limited to referring strictly to one or more statutory apparatus, article of manufacture, or the like that is not a signal or carrier wave per se, such as computing device 101 that encompasses client devices, mobile devices, wearable devices, one or more servers, network services such as an Internet services or corporate network services based on one or more computers, and the like, and/or any combination thereof. Thus, a computing device, as the term is used herein, is also intended to be and must be interpreted as statutory subject matter.

FIG. 1 is an illustrative block diagram of system 100 based on a computer 101. The computer 101 may have a processor 103 for controlling the operation of the device and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Alternatively, some or all of computer executable instructions may be embodied in hardware or firmware (not shown). The computer 101 executes the instructions embodied by the software to perform various functions.

Input/output ("I/O") module may include connectivity to a microphone, keyboard, touch screen, and/or stylus through which a user of computer 101 may provide input, and may also include one or more speakers for providing audio output and a video display device for providing textual, audiovisual and/or graphical output.

System 100 may be connected to other systems via a LAN interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be devices including various other components, such as a battery, speaker, and antennas (not shown).

Terminal 151 and/or terminal 141 may be portable devices such as a laptop, cell phone, smartphone, smartwatch, or any other suitable device for storing, transmitting and/or transporting relevant information. Terminals 151 and/or terminal 141 may be other devices. These devices may be identical to system 100 or different. The differences may be related to hardware components and/or software components.

Figure 2:
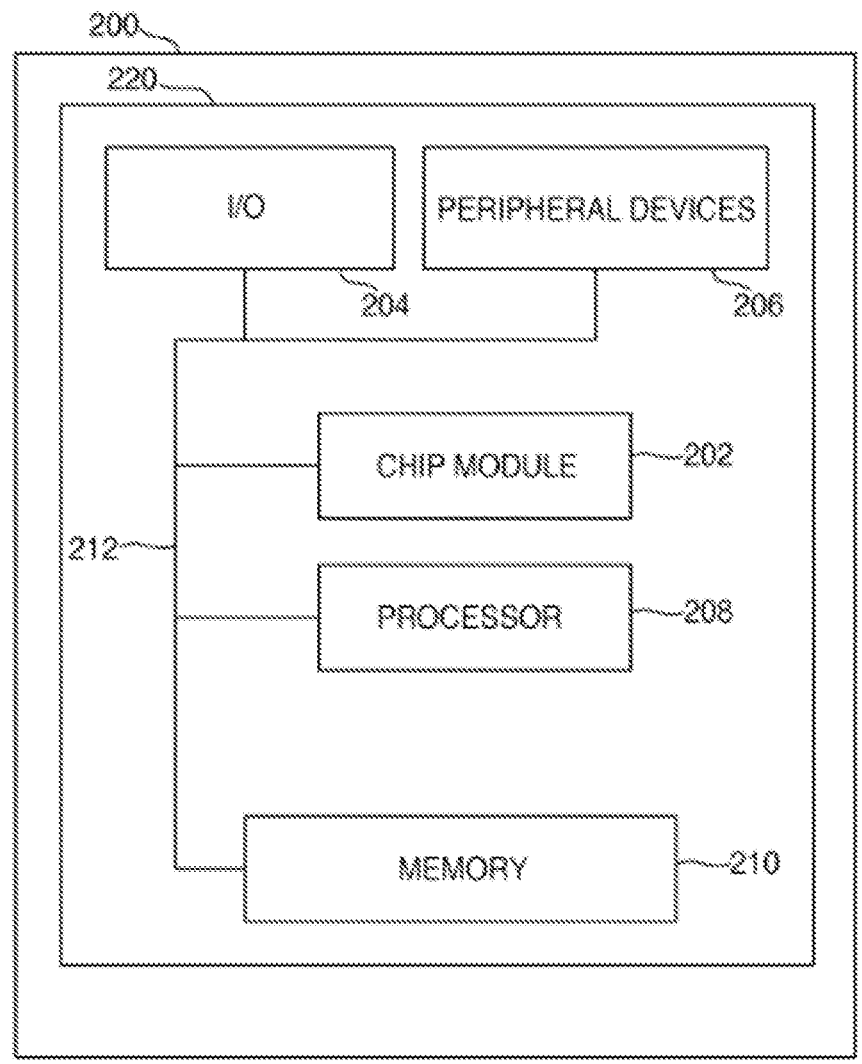
FIG. 2 is an illustration of a computing machine.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may test submitted information for validity, scrape relevant information, aggregate user financial data and/or provide an auth-determination score(s) and machine-readable memory 210.

Machine-readable memory 210 may be configured to store in machine-readable data structures: information pertaining to a user, information pertaining to an account holder and the accounts which he may hold, the current time, information pertaining to historical user account activity and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

In an embodiment, the apparatus is configured to convert film to a digital format. In an embodiment, the apparatus may accept 8 mm and Super 8 mm Film. However, in other embodiments, the apparatus may accept any analog video format. The apparatus may be configured to output video in a digital format (for example, a MPEG, MOV, MP4, AVI, or other video file). In another embodiment, the apparatus may be configured to output video in a physical digital medium (for example, DVD). As a non-limiting example, the apparatus may be in electronic communication with, and transmit converted video to, a peripheral device, such as a VCR, DVD player, desktop computer, or external hard drive.

In an embodiment, the apparatus may have the following dimensions: 12.4"×6.1"×8.4" (31.5×15.4×21.3 cm). However, in other embodiments, the apparatus may be any size. In an embodiment, the apparatus may include an image sensor (for example, a 8.08 megapixels (3280×2464) ⅓" CMOS sensor). The apparatus may be configured to operate in a native resolution (for example, 1296p). The display may be a 5" LCD. However, in alternate embodiments, the display may be LED or any other type of display. The display may also be any dimension. In an embodiment, the apparatus includes a removable memory capacity, for example a 128 GB SD card. The apparatus may be configured to output files in the MPEG-4 format. In an embodiment, the apparatus may have a power source (for example, 12 V DC).

In an embodiment, the apparatus may allow for a user to adjust video settings. The apparatus may be configured to allow adjustment of exposure control (for example, auto, manual [−2 to +2 EV]); white balance (for example, auto); frame rate (for example, 20 frames/sec); focus system (for example, fixed focus); and scan speed (for example, 2 frames/sec). However, in other embodiments, the apparatus is not limited to the aforementioned adjustments. In an embodiment, a user's preferred video settings may be transmitted to the computer 101, where the computer 101 may instruct the camera and/or other components of the apparatus to make such adjustments. In an embodiment, the apparatus, for example via the memory, may save a user's preferred video settings. In such an embodiment, the memory may contain one or more preferred video settings in the form of computer-executable instructions. The computer 101 may be instructed to automatically impose one or more of the preferred video settings on a new video conversion session.

In an embodiment, the apparatus may be configured for various language options (for example, English/Spanish/French/German/Italian/Chinese). The apparatus may be configured to operate on or with various operating systems (for example, Windows XP, Vista/Windows 7, 8, and 10/Mac 10.7.3).

Figure 3:
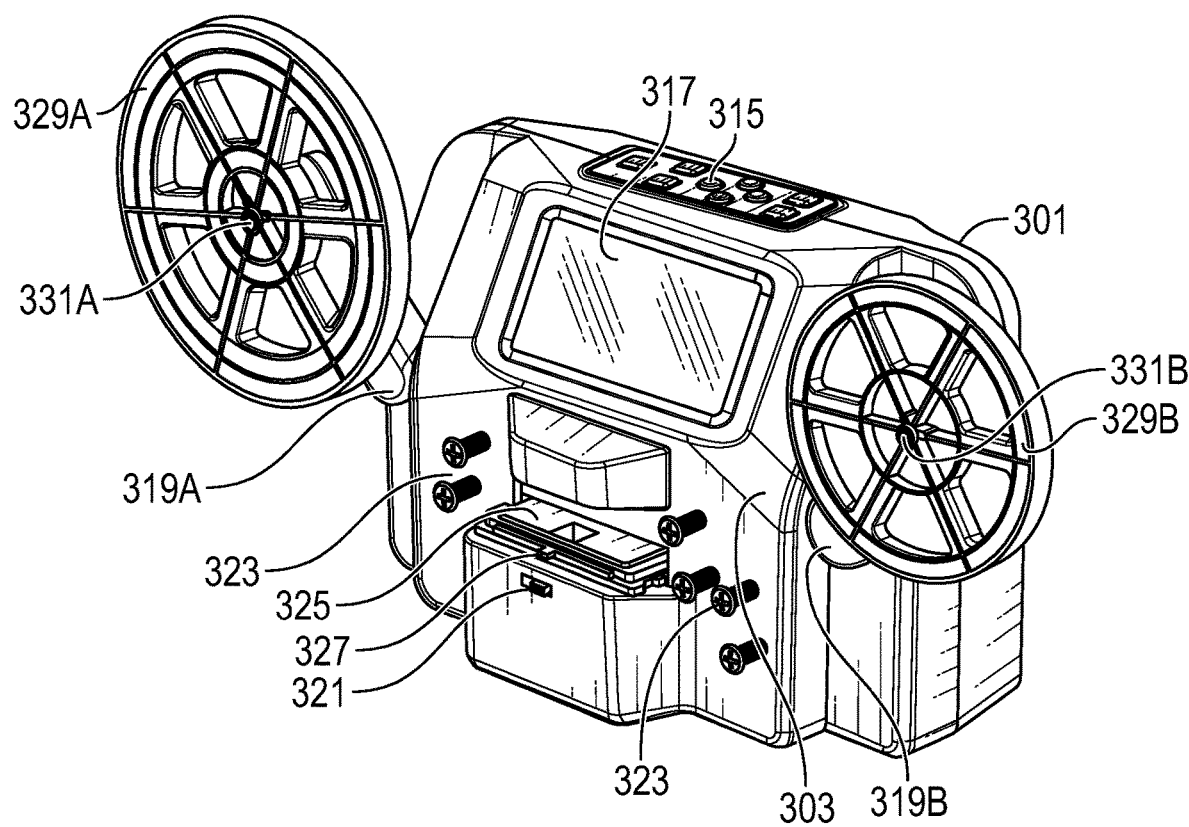
FIG. 3 is an illustration of an apparatus configured to convert film to a digital format.

Referring to FIG. 3, in an embodiment the apparatus includes a body 301. The body 301 may be comprised of a front face 303, a rear face 305, a top surface 307, a bottom surface 309, a right side 311, and a left side 313. The body 301 may be comprised of plastic or another suitable alternative. In one embodiment, the body 301 is comprised of recycled plastic. In an embodiment, the body 301 is comprised of one or more members (for example, the body 301 is comprised of two portions that fit together in a "clam shell" manner).

The front face 303 (or any other wall of the body 301) may include a control panel 315 and/or a display 317. The control panel 315 may include a number of buttons. The buttons may be in electrical communication with the computer 101. In such an embodiment, the buttons are mapped to particular functions of the apparatus (for example, play, pause, rewind, etc.). The control panel 315 may be comprised of physical buttons (for example, mechanical keys or pressure sensitive keys) or touch buttons (for example, capacitive touch screen technology).

The display 317 may be disposed on the top portion of the front face 303. However, in alternate embodiments, the display 317 may be disposed on any portion of the body 301. The display 317 may be LED, LCD, or any other suitable alternative. The display 317 may be in electrical communication with at least the computer 101. The display 317 may be configured to display a menu, a selection interface, and/or a pre-recorded or real time visual representation of the converted video.

In an embodiment, the apparatus includes one or more reel shafts 319A/319B. The one or more reel shafts 319A/319B may be disposed on the front face 303. However, in other embodiments, the one or more reel shafts 319A/319B may be disposed on any side of the body 101. In an embodiment, the one or more reel shafts 319A/319B are collapsible and/or foldable. In an embodiment, the reel shaft 319A/319B may be configured to rotate a complete 360 degrees. However, in an alternate embodiment, the reel shaft 319A/319B may be configured to have a range of motion of 140 degrees. In another embodiment, the reel shaft 319A/319B may have any suitable range of motion. At least one, or all of the reel shafts 319A/319B, may be configured to swing from a stored position to an active position. In an active position the reel shafts 319A/319B may be in a position enabling film conversion. In a stored position the reel shafts 319A/319B may be in a position where the apparatus in more compact. In such a stored position, the reel shafts 319A/319B may fold into a position where the reel shafts 319A/319B are proximal to an indentation(s) in the front face 303. Each reel shaft 319A/319B may have a proximal end and a distal end (for example, the proximal end closer to the apparatus). In an embodiment, the reel shafts 319A/319B may interface with one or more springs and/or detents that mark the active positions of the reel shafts 319A/319B. In an embodiment, the reel shafts 319A/319B may "click" into place when a user rotates the reel shafts 319A/319B from the stored position to the active position.

In an embodiment, a steel shaft and a bearing connect through the proximal end of the reel shaft 319A/319B. In such an embodiment, a steel shaft and a bearing enable the reel shaft 319A/319B to swivel about the proximal end. As a non-limiting example, a shaft hole may be disposed on the front face 303 and a complimentary hole may be disposed on the proximal end of the reel shaft 319A/319B, such that the steel shaft may traverse both holes. In such a non-limiting example, the shaft holes may be sized to accept the steel shaft. Further, in such a non-limiting example, the bearing may be disposed in either the front face 303 and/or the proximal end of the reel shaft 319A/319B. In an embodiment, the steel shaft may be composed of any suitable material. In an embodiment, the steel shaft hole within the front face 303 and reel shaft 319A/319B form a continuous shaft channel sized to accept the steel shaft and/or the bearing. The bearing may be disposed within the continuous shaft channel on the outer most portion of the continuous shaft channel. As a non-limiting example, the bearing may be captured within the proximal end of the reel shaft 319A/319B.

In an embodiment, a reel 329A and a reel 329B may be disposed on distal ends of reel shaft 319A and 319B, respectively. Reel 329A/329B may be configured to accept film (for example, 8 mm film strips). The reels 329A/329B may be fastened to the distal end of the reel shafts 319A/319B with reel pins 331A/331B. The reels 329A/329B and reel pins 331A/331B may be configured such that the reels 329A/329B rotate with the reel pins 331A/331B at the reel center. The reel pins 331A/331B and/or reels 329A/329B may be removable from the reel shafts 319A/319B. In an embodiment, a reel adapter may be disposed on the reel pins 331A/331B, enabling a snug fit for different sized reels 329A/329B. In an embodiment, the reel pin 331B is driven by a motor and the reel pin 331A itself does not move. As a non-limiting example, reel pin 331B is a film receiving pin and is driven by a motor housed within the reel shaft 319B or body 301 and reel pin 331A is a film releasing shaft that is pulled by the film as it moves. For example, the reel pin 331B may be configured to rotate about the distal end of the reel shaft 319B, causing the reel 329B to rotate, pulling film across the camera. Further, the reel pin 331A may be stationary, but configured to allow the reel 329A to rotate about the reel pin 331A due to the motor's affect on reel 329B. In an alternate embodiment, the reel pin 331A is partially captured within the distal end of the reel shaft 319A, but is configured to spin, enabling the reel 329A to rotate with decreased friction. The reel pins 331A/331B and/or the reel pin receiving holes disposed on the reels 329A/329B may be sized and/or configured to impose some degree or no degree of friction on the rotation of reels 329A/329B. For example, friction (or lack thereof) in the rotation of the reels 329A/329B may enable the apparatus to more accurately capture the film frames.

In an embodiment, one or both reels 329A/329B may be mechanically tethered to one or more motors. In an embodiment, the one or more motors may be configured to drive the rotation of one or more reels 329A/329B (for example, allowing film to be fed from one reel to the other). In an embodiment, a motor(s) may be disposed within either or both reel shafts 319A/319B. In another embodiment, a motor(s) may be disposed within the body 301. In such an embodiment, the motor may be in mechanical communication with the reel 329A/329B and/or the reel pin 331A/331B. Further, in such an embodiment, a belt may be disposed between the motor and the reel 329A/329B and/or reel pins 331A/331B (for example, allowing rotational motion of the motor to translate to rotational motion of the reel). In an embodiment, the belt may be flexible (such that the reel shaft 319A/319B may be folded without imparting undue tension on the belt). In an embodiment, a stepper motor may be used to pull the film accurately and/or a worm motor may be used to pull the film receiving shaft. The motors may be mounted to the body 301 and/or reel shaft 319A/319B with a bracket and screws.

In an embodiment, the motor(s) drive a gear, causing the gear to drive a pin or shaft, and the pin or shaft interfacing with the motor and the pin or shaft interfacing with the reel 329A or 329B are connected with a synchronous belt (for example, through a synchronous wheel). In an embodiment, the combination of the shaft, pins, bearing coupled with a friction plate, and/or limit column enables the reel shaft 319A and/or 319B to fold normally but not rotate 360 degrees. In such an embodiment, the timing belt is configured to be wound so that it is not too loose to work and not too tight that it will break. As a non-limiting example, the timing belt is configured with an elasticity, length, and/or dimensions such that the shaft(s) 319A/319B may be folded without negatively impacting the function of the belt.

In an embodiment, all or the majority of rotational energy begins with reel shaft 319B. In such an embodiment, the motor in mechanical communication with reel 329B is configured to rotate reel 329B directly and reel 329A indirectly.

In an embodiment, the apparatus includes a film type selector 321, which may be disposed on the front face 303. The film type selector 321 may be a switch, button, or lever, enabling a user to select the type of film they are seeking to convert. In one embodiment, the film type selector 321 includes two settings: 8 mm Film and Super 8 mm Film. However, in alternate embodiments, the film type selector 321 may include additional settings (for example, for other types of film). In another embodiment, the film type selector 321 may be disposed on the top surface 307 and/or control panel 315. In an alternate embodiment, the film type selector 321 is not a physical component, but instead an option available on the display 317 (selectable by touch or by the control panel 315). The film type selector 321 may be in electrical communication with the computer 101, such that the computer 101 may instruct the motor(s) and/or other components of the apparatus to configure for a particular type of film conversion. For example, the computer 101 may instruct the motor driving the reel to rotate at one speed for 8 mm film and a second speed for Super 8 film.

In an embodiment, one or more film spools 323 are disposed on the front face 303. The film spools 323 may be metal pegs perpendicular to the front face 303. The apparatus may be configured to direct film through the film spools 323. While the apparatus may include any number or arrangement of film spools 323, an exemplary version is visible in FIG. 3. The film spools 323 may be configured to be moved further or closer to the front face 303 (for example, providing more or less surface area on the film spools 323 for films of different width). In an embodiment, the number or position of the one or more film spools 323 may be configured such that a sufficient friction is imparted on the film. For example, the friction may be configured to enable pulling of the film in a manner that promotes stable image recording.

In an embodiment, the apparatus is configured to feed film under a film lid 325. The film lid 325 may be disposed on the front face 303. The film lid 325 may include a window, enabling a camera 333 to capture the frames of the film as they pass the window. The film lid 325 may include a film lid tab 327, enabling a user to lift the film lid 325.

The camera 333 may be in electrical communication with the computer 101. The computer may be configured to convert the images captured by the camera 333 into a digital format. In an embodiment, the computer 101 is in electrical communication with the motor, such that the motor imparts specific rotational motion on the one or more reels 329A/329B. For example, the computer 101 may send a signal to the motor to induce only enough motion to move the film by the length of one film frame. In an embodiment, the stepper motor may be controlled by a digital signal processor (or another processor) to make the film move accurately, such that the camera synchronously records the film. If the synchronization image is not controlled, the image may be unstable and the picture may appear "shaky."

Figure 4:
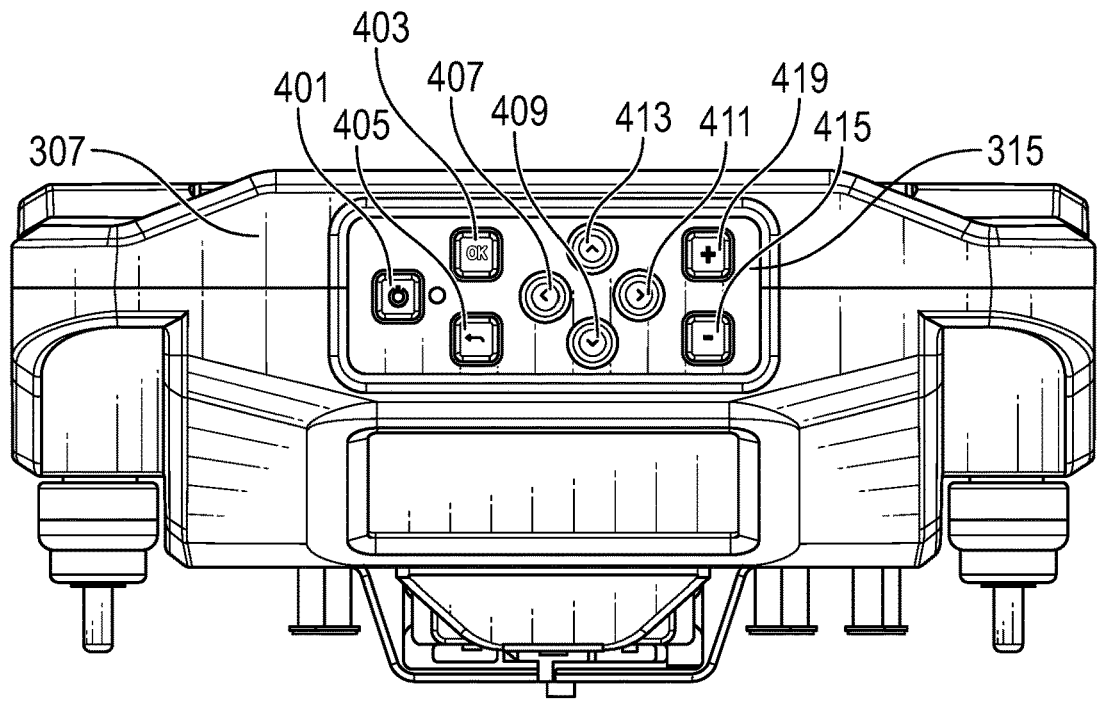
FIG. 4 is an illustration of a control panel for a film conversion apparatus.

Referring to FIG. 4, the control panel 315 may be disposed on the top surface 307. The control panel 315 may include any number of buttons. In an embodiment, the control panel 315 includes (as a non-limiting list) the following buttons: power 401, OK/Enter 403, back 405, left 407, down 409, right 411, up 413, minus 415, and plus 417. The buttons may be in electrical communication with the computer 101, such that the buttons adjust the manner in which the film is being recorded or adjust other settings on the apparatus.

Figure 5:
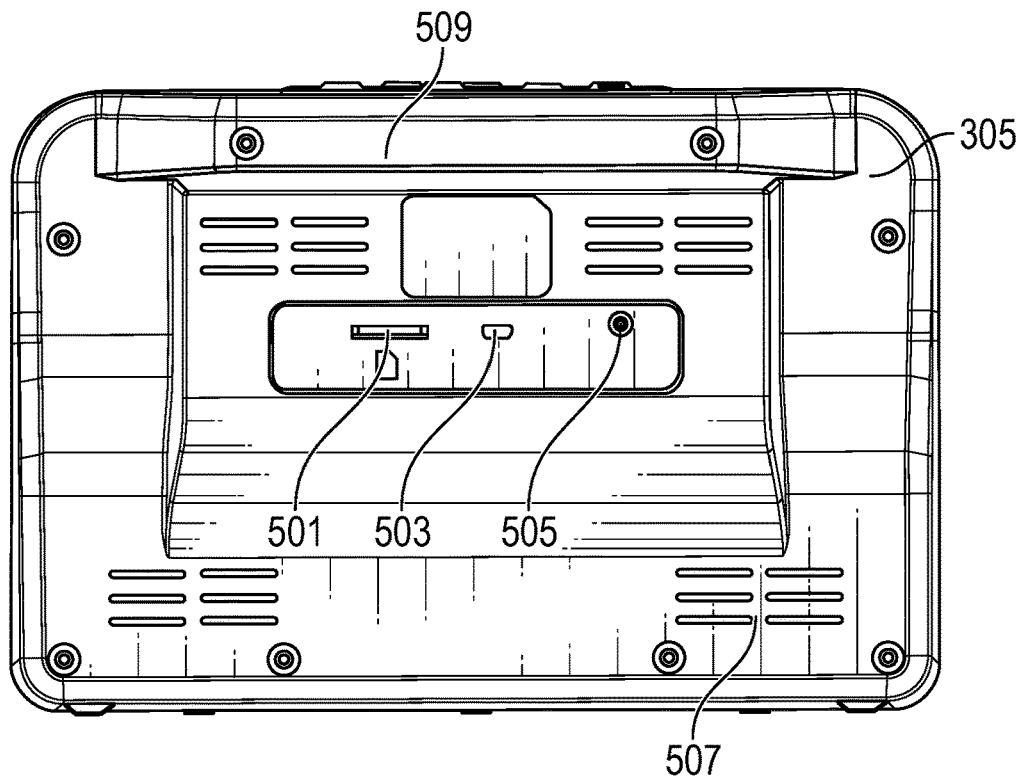
FIG. 5 is an illustration of the rear face of a film conversion apparatus.

Referring to FIG. 5, the rear face 305 may include a memory card slot 501, a MICRO USB port 503, and/or a power input 505 (for example, a DC 12 V port). In an embodiment, the memory card slot 501 may be configured to accept an SD card, micro SD, or any other memory card. In an embodiment, the rear face 305 may include a USB port or any other accepted method of information transfer. In an embodiment, the memory card slot 501, MICRO USB port 503, and/or power input 505 are in electrical communication with the computer 101. In an embodiment, the rear face 305 and/or other walls of the body 301 have one or more vents 507 (for example, configured to enable fluid communication between the environment and the inside of the body 301). In an embodiment, a cooling fan may be disposed within the apparatus to cool the motor(s), circuit board, and/or the overall temperature. The cooling fan may be in electrical communication with the computer 101. The computer 101 may contain computer executable instructions that may direct the cooling fan to initiate at certain pre-determined temperature thresholds or during particular operations (for example, during film conversion). In an embodiment, the computer 101 may be in communication with one or more temperature sensors, where the one or more temperature sensors are configured to inform the computer 101 of one or more temperatures within the apparatus.

In an embodiment, the top surface 307 may extend over the rear face 305, creating an overhang and/or a handle 509. In another embodiment, the rear face 305 may slope inward or contain an indentation that further creates the handle 509. The handle 509 may also include a cavity within the inside surface of the top surface 307. The handle 509 may also include finger grooves or a textured finish to enable easier gripping.

In an embodiment, the invention of the present disclosure involves a method of installing film on the apparatus prior to conversion. The method may begin by unfolding the two reel shafts until they click into place. A user may then carefully pull out the end of the film on an 8 mm or Super 8 reel (or other film medium). Next, a user may fold up the end of the film tightly and slowly insert the end of the film into the slot on the empty reel. This process may help the user connect the film to the empty reel. A user may then spin the empty reel around one or more revolutions to ensure that the film is now securely connected to the empty reel. A user may next insert the reel onto the left reel shaft and place the empty reel onto the right reel shaft. In an embodiment, where the reel being mounted by the user has a larger mounting hole the user may use a reel adapter. The user may take the film between the two reels and carefully thread it through the scanner. Next, the user may thread the film onto the film spools. Further, a user may push the film lid tab to the left to lift the film lid and gently wipe down the film area with a cleaning cloth before placing the film. In an embodiment, the user may insert the film into the film slot. The holes on the film may be facing up such that the pin in the film slot may go through each film hole. Next, a user may press down on the film until it pushes under a number of tabs. In an embodiment, the user may hear a click when the film is pushed correctly under each tab. The user may then press down on the film lid once the film is in place. Finally, the user may use the switch in front of the film scanner to confirm whether the user is using the 8 mm or Super 8 film.

In an embodiment, the invention of the present disclosure includes a method for operating the apparatus. This method may include connecting the power adapter to the scanner. Then, the user may plug the other end of the power adapter into a power outlet. Next, the user may insert a memory card into the memory card slot. The user may next press the Power button to turn on the scanner and the main menu may appear on the display. In an embodiment, the scanner may take a few seconds to turn on. In an embodiment, the scanner may be configured to automatically shut down after a period of inactivity (for example, 15 minutes).

While this invention has been described in conjunction with the embodiments outlined above, many alternatives, modifications and variations will be apparent to those skilled in the art upon reading the foregoing disclosure. Accordingly, the embodiments of the invention, as set forth above, are intended to be illustrative, not limiting. Various changes may be made without departing from the spirit and scope of the invention.

What is claimed is:

1. A film conversion apparatus comprising:
a body;
a first reel shaft having a first proximal end and a first distal end;
a first reel disposed on the first distal end;
a second reel shaft having a second proximal end and a second distal end,
wherein the first proximal end and the second proximal end are movably attached to the body;
a second reel disposed on the second distal end;
a camera configured to capture a plurality of frames;
a computer configured to convert the plurality of frames to a digital format;
a motor in electrical communication with the computer;
a film type selector in electrical communication with the computer,
the film type selector configured to select at least one film type,
the at least one film type configured to instruct the motor, via the computer, to rotate at one or more speeds.

2. The apparatus of claim 1, wherein the first reel shaft is foldable.

3. The apparatus of claim 2, wherein the second reel shaft is foldable.

4. The apparatus of claim 3, further comprising a belt, the motor in mechanical communication with the second reel via the belt.

5. The apparatus of claim 4, wherein the belt is flexible.

6. The apparatus of claim 1, further comprising a display in electrical communication with the computer.

7. The apparatus of claim 1, further comprising a control panel having a plurality of buttons, each of the plurality of buttons in electrical communication with the computer.

8. The apparatus of claim 1, further comprising a handle.

9. The apparatus of claim 1, wherein the first reel and the second reel are detachable from the first reel shaft and the second reel shaft, respectively.

10. The apparatus of claim 1, wherein the at least one film type is selected from the group consisting of standard 8 mm film and Super 8 film.

* * * * *